US011537988B2

(12) United States Patent
Elsebø et al.

(10) Patent No.: US 11,537,988 B2
(45) Date of Patent: *Dec. 27, 2022

(54) CROWDSOURCED CONTENT SHARING

(71) Applicant: Microsoft Technology Licensing, LLC, Redmond, WA (US)

(72) Inventors: Kristian Elsebø, Tromsø (NO); Dag Eidesen, Tromsø (NO); Jon Meling, Tromsø (NO)

(73) Assignee: Microsoft Technology Licensing, LLC, Redmond, WA (US)

(*) Notice: Subject to any disclaimer, the term of this patent is extended or adjusted under 35 U.S.C. 154(b) by 20 days.

This patent is subject to a terminal disclaimer.

(21) Appl. No.: 17/170,053

(22) Filed: Feb. 8, 2021

(65) Prior Publication Data

US 2021/0166195 A1 Jun. 3, 2021

Related U.S. Application Data

(63) Continuation of application No. 16/785,320, filed on Feb. 7, 2020, now Pat. No. 10,915,865, which is a continuation of application No. 15/631,631, filed on Jun. 23, 2017, now Pat. No. 10,565,559.

(51) Int. Cl.
*G06Q 10/00* (2012.01)
*G06Q 10/10* (2012.01)
*H04L 65/403* (2022.01)
*G06Q 50/00* (2012.01)
*G06F 16/2457* (2019.01)
*G06F 16/9535* (2019.01)

(52) U.S. Cl.
CPC ..... *G06Q 10/101* (2013.01); *G06F 16/24578* (2019.01); *G06F 16/9535* (2019.01); *G06Q 50/01* (2013.01); *H04L 65/403* (2013.01)

(58) Field of Classification Search
None
See application file for complete search history.

(56) References Cited

U.S. PATENT DOCUMENTS

| 9,304,976 | B1* | 4/2016 | Cashmore | H04L 67/10 |
| 9,690,910 | B2* | 6/2017 | Fushman | G06F 21/10 |
| 2008/0273699 | A1* | 11/2008 | Roth | H04L 63/1416 380/241 |

OTHER PUBLICATIONS

"How to Extract Frequent Links with Frequent Item sets in Social Networks?" by Erick Stattner and Martine Collard (IEEE 2011) (Year: 2011).*

(Continued)

*Primary Examiner* — Sam Refai
*Assistant Examiner* — Rashida R Shorter

(57) ABSTRACT

In non-limiting examples of the present disclosure, systems, methods and devices for recommending content are presented. An electronic communication between a plurality of members of a common entity may be received. A link to web content in the electronic communication may be identified. A number of instances that the link has been electronically shared with members of the common entity may be determined. A determination may be made as to whether a content propagation threshold has been exceeded based on electronic sharing of the link amongst members of the common entity. The link may be provided for propagation upon determining that the content propagation threshold has been exceeded.

20 Claims, 9 Drawing Sheets

(56) References Cited

OTHER PUBLICATIONS

Erick Stattner and Martine Collard "How to Extract Frequent Links with Frequent Item sets in Social Networks?" (IEEE 2011) (Year: 2011) (Year: 2011).*

* cited by examiner

CROWDSOURCED CONTENT SHARING

CROSS-REFERENCE TO RELATED APPLICATIONS

This application is a continuation of U.S. application Ser. No. 16/785,320, filed Feb. 7, 2020, now U.S. Pat. No. 10,915,865, which is a continuation of U.S. application Ser. No. 15/631,631, filed Jun. 23, 2017, now U.S. Pat. No. 10,565,559, which are hereby incorporated by reference in their entirety herein.

BACKGROUND

Electronic links to online content are distributed via many forms of electronic communication, such as email and instant messaging applications. For example, a manager in an organization may send a link associated with useful content to five members of an organizational team, and one or more of those five team members may forward the link to additional organizational members that they believe might be interested in the content. Although the link may become widely distributed throughout the organization, it is likely that some organizational members that would have found the link content to be useful or interesting may not receive that information via member-to-member communication.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods, and devices for recommending content associated with a shared link to one or more members of an entity. According to examples, electronic communications and/or signals associated with electronic communications to and/or from associated entity members may be received and a determination may be made as to whether the electronic communications include a link to web content. In some examples a determination may be made as to a number of instances that a link to web content has been shared amongst entity members, or associated groups of entity members. According to some examples, associated groups of entity members may be identified based on a communication value determined for pairs of entity members. A determination may be made as to whether a content propagation threshold has been exceeded based on electronic sharing of a link amongst entity members. For example, a determination may be made as to whether content accessible by a link meets an approved dissemination list based on analysis of one or more categorical types of content accessible by the link as it relates to categorical types of content that are allowable for dissemination according to an inclusion list and/or one or more filters. Upon determining that the content propagation threshold has been exceeded, a link and/or content associated with a link may be provided to one or more entity members.

BRIEF DESCRIPTION OF THE DRAWINGS

Non-limiting and non-exhaustive examples are described with reference to the following figures.

DETAILED DESCRIPTION

Figure 1:
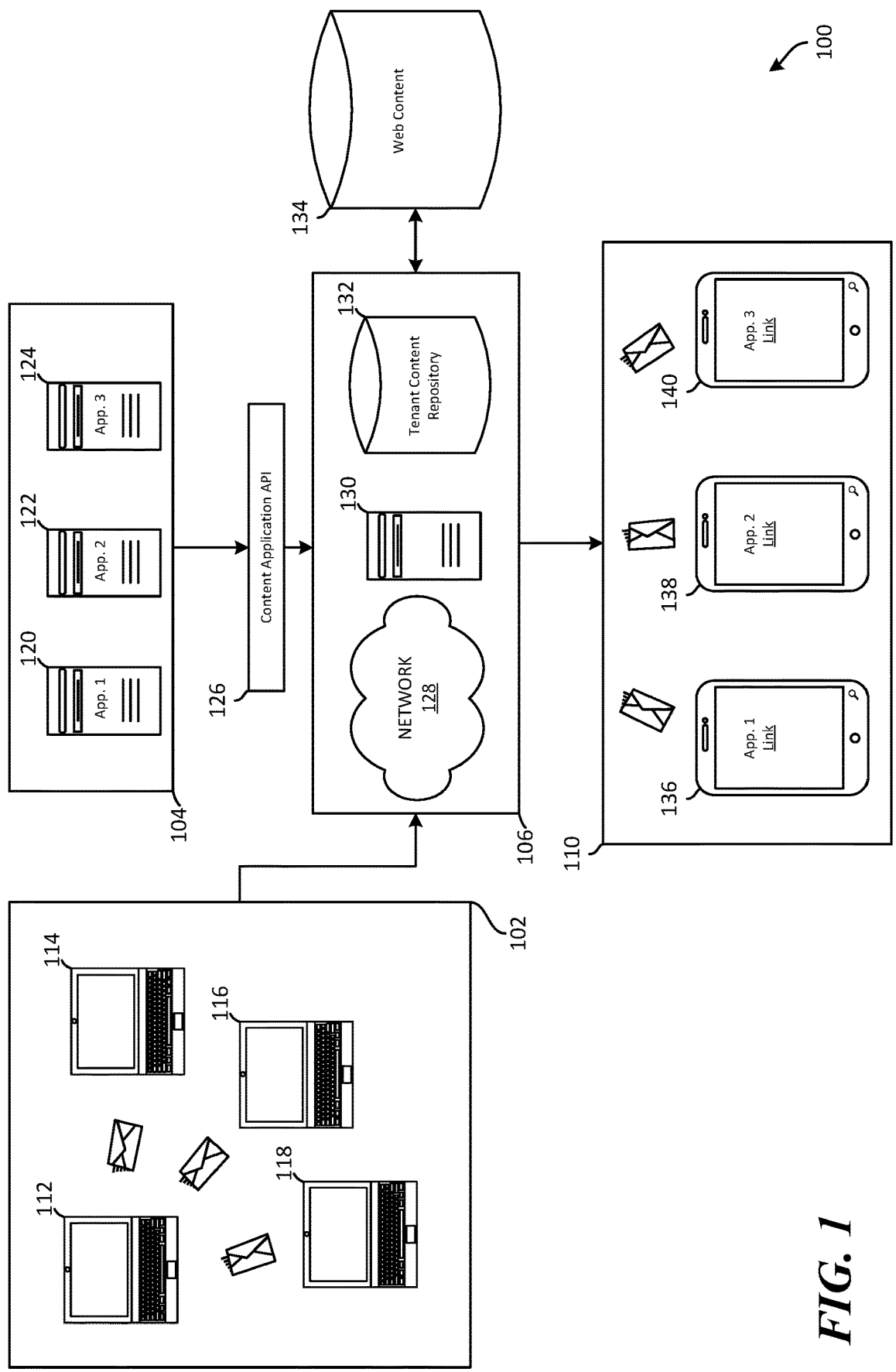
FIG. 1 is a schematic diagram of an exemplary environment for recommending content associated with a shared link.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods, and devices for recommending content associated with a shared link. According to examples a set of users may be associated with one another via one or more relationships related to corresponding user profiles. For example, user profiles may be associated with one another based on sharing a common computer network, sharing a computer network tenancy, sharing an email domain, communicating with one another to a certain degree (e.g., frequency, type of content shared), being members of the same organization, etc. Each user profile may be associated with one or more communication applications, such as email applications, calendar applications, instant messaging applications, voice communication applications, audio communication applications, etc.

According to examples, one or more computing devices associated with the methods, systems, and devices described herein may receive electronic communications and/or one or more signals associated with electronic communications sent by members of a set (i.e., associated users). In other examples, one or more computing devices associated with the methods, systems, and devices described herein may receive electronic communications and/or one or more signals associated with electronic communications received by members of a set. Upon receiving an electronic communication sent or received by a member of the set, the electronic communication, and/or one or more received signal associated with that communication, may be analyzed for the presence of a link within that communication. As described herein a "link" may refer to a hyperlink, a deep link, and/or any other object that can be embedded in electronic content and provide access to online content referenced by the object.

When a link is identified in an electronic communication, that link may be analyzed and/or accessed and a determination may be made as to the source of the content that is accessible by the link, a categorical type of content that is accessible by the link, and the media content type that is accessible by the link. That information may be checked against an inclusion list in order to determine if the link may be provided for propagation by the methods, systems, and devices described herein.

The inclusion list may comprise a list of content types that are approved for dissemination to associated members of group. For example, the inclusion list may include website domains and categorical content types that are approved for dissemination to an entire entity, one or more groups or sub-groups within an entity, and/or one or more users associated with an entity. As described herein, an entity, an entity group, and/or an entity sub-group may be formal hierarchical entities and groups within those entities (e.g., a company and teams within that company), or non-formal entities and groups comprised of users that are determined to communicate with one another to a certain degree (e.g., frequency of communication, type of communication, content of communication, etc.).

The inclusion list may be automatically determined based on a profile of an entity comprised of information associated with online content about the entity (e.g., entity website content, social media communications associated with the entity, news articles associated with the entity, etc.). The content on the approved list may additionally or alternatively be determined by user input, such as an entity administrator designating content types and/or content sources that are approved for members of an entity. Thus, content types and content source providers that are deemed to be of interest to members of an entity based on an entity profile may be included in the inclusion list. In additional examples, one or more content filters may be associated with the inclusion list such that inappropriate content may be blocked from dissemination and/or inclusion on the inclusion list. For example, website domains associated with malicious content, malware, explicit content, etc., may be blocked from inclusion by one or more content filters associated with the inclusion list.

In some examples, an entity, an entity group, and/or an entity sub-group may comprise a set of communicatively connected members of a common entity. The set of communicatively connected members may be identified by analyzing a plurality of communication signals received from entity members and determining whether a plurality of entity members meet a communication threshold for associating those members with one another based on those communications and an associated communication value determined for those users.

According to examples, a plurality of communication signals amongst application users may be received. For example, signals regarding communications between a plurality of users may be received from applications such as email applications, calendar and appointment applications, voice call applications, video call applications, text communication applications, etc. Thus, a first application user may send an email to a second application user, a corresponding signal may be received, and a determination may be made based on that email, as well as other communications between those users, regarding a communication value to assign between those two users. According to examples, a value may be assigned to the received email based on one or more factors comprising: the length of the email, the content of the email, the number of other users that the email has listed in its "to" field, the number of other users that the email has listed in its "cc" field, etc. Those values may be utilized in calculating the communication value to assign between the two users.

In another example, a first application user may send a calendar invite to a second application user, a corresponding signal may be received, and a determination may be made based on that calendar invite, as well as other communications between those users, regarding a communication value to assign between those two users. According to examples, a value may be assigned to the received calendar invite based on one or more factors associated with the calendar invite comprising: the length of the scheduled calendar appointment, the content of the calendar invite, the number of additional application users included on the calendar invite, etc. Those values may be utilized in calculating the communication value to assign between the two users.

In additional examples, a first application user may call a second application user via a voice call application, a corresponding signal may be received, and a determination may be made based on that voice call, as well as other communications between those users, regarding a communication value to assign between those two users. According to examples, a value may be assigned to the received voice call based on one or more factors associated with the voice call comprising: whether the call was answered, the length of the call, the number of other application users that were invited to the call, etc. Those values may be utilized in calculating the communication value to assign between the two users.

In other examples, a first application user may call a second application user via a video call application, a corresponding signal may be received, and a determination may be made based on that video call, as well as other communications between those users, regarding a communication value to assign between those two users. According to examples, a value may be assigned to the received video call based on one or more factors associated with the video call comprising: whether the call was answered, the length of the call, the number of other application users that were invited to the call, etc. Those values may be utilized in calculating the communication value to assign between the two users.

In still other examples, a first application user may send a text communication via a text communication application (e.g., a chat application, an instant messaging application, a collaborative text communication application, etc.) to a second application user, a corresponding signal may be received, and a determination may be made based on that text communication, as well as other communications between those users, regarding a communication value to assign between those two users. According to examples, a value may be assigned to the received text communication based on one or more factors associated with the text communication comprising: the type of text communication, the length of the text communication, the content of the text communication, the number of other application users that were included on the text communication, the number of other application users that attended the text communication, etc. Those values may be utilized in calculating the communication value to assign between the two users.

Each communication type (e.g., email communications, calendar and appointment communications, voice call communications, video call communications, text communications, etc.) may have a single value assigned to it in calculating the communication value to assign between two users. For example, only a number of each communication type between two application users may be utilized in calculating the communication value between the two users (e.g., a number of emails sent and received between two users, a number of calendar and appointment invites sent and received between two users, a number of voice calls made and answered and/or received between two users, a number of video calls made and answered and/or received between two users, a number of text communications and/or text communication application conversations started between two users). According to other examples, each type of communication between two users may receive a different value in calculating the communication value between the two users (e.g., an email communication between two users may be provided a first value in calculating the communication value between the two users, and a voice call communication between the two users may be provided a second value in calculating the communication value between the two users).

In examples, a determination may be made as to a number of instances that the link has been electronically shared with members of a common entity. That is, a determination may be made as to the number of times that the link has been sent to one member of an entity, sent from one member of an entity, sent between members of an entity, a number of members of an entity that have received the link, and/or number of members of an entity that have accessed the link after it has been sent to them. In some examples, each instance that a link has been electronically shared with members of a common entity may be archived in one or more shared link repositories.

In additional examples, a determination may be made as to whether a content propagation threshold has been exceeded based on electronic sharing of a link amongst members of a common entity. The content propagation threshold may be dependent on the size of a common entity, the size of one group or sub-group within a common entity, a categorical type of content that the link provides access to and a corresponding group of entity members that the categorical content type is likely of interest to, etc. For example, if the entity is a relatively large entity (e.g., greater than 5000 members, greater than 10,000 members), and the content that the link provides access to is approved for dissemination to the entire entity, the propagation threshold may only be exceeded when the number of instances that the link has been electronically shared is similarly relatively large (e.g., 500 or 1,000 sharing instances). Alternatively, if the link has been approved for dissemination to a relatively small group (e.g., 5 members, 20 members), the propagation threshold may only be exceeded when the number of instances that has been electronically shared is similarly relatively small (e.g., 1 member, 5 members). In some examples, the propagation threshold may relate to a percentage of members that linked content has been approved for dissemination to. For example, the propagation threshold may only be exceeded when a link has been sent, received, and/or accessed by a certain percentage of an entity or entity group. In additional examples, the propagation threshold may relate to the type of content that the link provides access to. For example, if a link provides access to content that is likely to be of interest to a large number or percentage of members, the propagation threshold may be lower than if it is likely to be of interest to a smaller number or percentage of members. In additional examples, the propagation threshold may relate to one or more hierarchical roles within a common entity that sharing members of a link have. For example, if a link is shared by a manager and/or member of an entity that is determined to be an influential or important member of an entity, then the metric for exceeding the propagation threshold may be smaller than if the link was only shared by other members of the entity.

If a determination is made that a propagation threshold for the link has been exceeded, the link may be provided for propagation. In some examples, providing the link for propagation may comprise sending an automated communication to one or more members that the link is approved for dissemination based on it matching approved content comprised within an inclusion list. In additional examples, the link and/or reference to the linked content may be archived for retrieval by one or more applications for propagation.

In some examples, a link and/or content associated with a link that has been approved for dissemination to an entity or one or more groups within an entity may be marked or otherwise identified as being available for propagation to one or more applications and/or one or more subscribing users of one or more applications. In additional examples, marking or otherwise identifying a link and/or content associated with a link for propagation to one or more applications may comprise providing an indication of at least one categorical type of content that the link provides access to. In some examples, the link and/or a reference to the linked content may be archived and marked or otherwise identified as being accessible to one or more applications when a request for content that is approved for dissemination to one or more entities or entity groups is received by one or more applications.

In some examples, an API may be provided for accessing one or more storage devices and retrieving associated content related to archived links that have been approved for dissemination to one or more entities or entity groups. For example, an email application or a content aggregation application may call into one or more devices associated with the storage of links or linked content that are approved for dissemination to one or more entities or entity groups, and a link to that content or the content itself may be provided to the calling application, which may then disseminate the link and/or content to members that it has been approved for.

According to examples, each of the communication applications that a user's profile is associated with may comprise user-selectable privacy controls that allow a user to indicate which, if any, communication signals to allow computing devices associated with the methods, systems, and devices described herein to collect. For example, an application user may be prompted when she creates her application profile to select which, if any, communications she would like to have monitored for signal collection. Similarly, an application user may be prompted when she creates her application profile to select which communication signals she would like to have collected by the methods, systems, and devices described herein. For example, a user may select an option to not have any of her communication signals collected. Alternatively, a user may select an option to only have a number communications between herself and other application users to be counted (e.g., count the number of emails that the user sends to each of a plurality of other application users, count the number of voice application calls that the user initiates with each of a plurality of other application users, etc.). In still other examples, a user may select an option to have the length and/or content of her communications collected or not collected. Each of the above-described privacy controls may similarly be selectable in a settings menu provided by one or more applications that a user's application profile is associated with.

Turning specifically to the examples shown in the figures, FIG. 1 is a schematic diagram of an exemplary environment 100 for recommending content associated with a shared link. Exemplary environment 100 includes entity member sharing sub-environment 102, application content provider sub-environment 104, content application API 126, network and member communication processing sub-environment 106, web content 134, and application dissemination sub-environment 110.

Entity member sharing sub-environment 102 includes computing devices associated with sharing of a link via one or more communication applications. For example, member computing device 112 may send an electronic communication to one or more of member computing devices 114, 116, and 118, via communication applications such as an email application, an instant messaging communication, a collaborative work application, etc. An electronic communication sent/and or received by one or more of member computing devices 112-118 may be transferred and received, via network 128, by one or more computing devices and/or storage services in member communication processing sub-environment 106, such as server computing device 130 and tenant content repository 132.

Server computing device 130 may receive electronic communications, and/or one or more corresponding communication signals, sent and/or received by one or more associated users. Server computing device 130 may perform operations related to identifying a link to web content in such electronic communications, and if a link is identified in an electronic communication, determining whether the link and/or content that the link provides access to may be approved for further dissemination. For example, server computing device 130 may perform one or more operations related to determining one or more types of categorical content that the link provides access to. For example, server computing device 130 may analyze a web domain associated with a link that has been identified in a received electronic communication, and determine whether that domain is on an approved list for dissemination to one or more users. In another example, server computing device 130 may access content that is accessible by the link and determine at least one categorical type of content that the content relates to. In some examples, server computing device may access content that is accessible by the link by accessing the World Wide Web as shown as web content 134, via network 128. Categorical types of content may include high-level categories, such as: business, sports, science, etc., as well as more specific categories associated hierarchically with such high-level categories, such as: business>industry area>SaaS>stock market projections>market area; sports>winter sports>skiing>skiing gear>women skiing gear>skiing gear item type; science>news article>science industry (e.g., biotech, computer science, etc.)>industry topic.

Upon determining a type of categorical content that is associated with a link, server computing device 130 may determine whether that type of content is approved for dissemination to one or more users based on that content type being included on an inclusion list. For example, one or more types of content may be approved for dissemination to an entire entity and/or groups within an entity based on a determined entity profile that is included in an inclusion list, based on one or more user and/or system administrator inputs related to approved content types, etc. In additional examples, server computing device may employ one or more filters to identify link-associated content that may be malicious in nature and/or otherwise inappropriate for dissemination, and block that information from being disseminated to users.

In some examples, when a received electronic communication is received, server computing device 130 may make a determination as to a number of instances that the link has been electronically shared with one or more associated members of an entity and/or an entity group that the methods, systems, and devices described herein provide content dissemination/recommendation services for based on shared link processing. For example, each time an electronic communication that includes a link is received, an indication regarding the number of sharing instances for that link may be archived. In some examples, the number of sharing instances for a link may be archived on a storage device residing in server computing device 130. In other examples, the number of sharing instances for a link may be archived on a storage device that is separate from server computing device 130, such as tenant content repository 132. Thus, when a new electronic communication that includes a link is received, the archive may be queried in order to determine whether that link was previously shared, and if so, in what number of instances it was previously shared. The previous number of shared instances for a link may be summed with the number of sharing instances based on reception of the new electronic communication that includes the link in order to identify a total number of instances that the link has been electronically shared with members of a common entity or a group within the common entity.

In some examples, server computing device 130 may determine whether a content propagation threshold has been exceeded based on a number of instances that a link has been electronically shared with members of a common entity. In some examples, the propagation threshold may relate to a number of entity members that send the link. In other examples the propagation threshold may relate to a number of entity members that receive and/or access the link. In still other examples, the propagation threshold may relate to a number of entity members that send the link, and a number of entity members that receive and/or access the link. The threshold propagation threshold may be number-based such that a number of entity members that sent, received, and/or accessed the link must be over a certain threshold in order to provide the link for propagation. Additionally or alternatively, the threshold propagation threshold may be percentage-based such that a percentage of members of an entity, or a group within that entity, that sent, received, and/or accessed the link must be over a certain threshold in order to provide the link for propagation.

If a determination is made that a propagation threshold for an entity or an entity group has been exceeded, server computing device 130 may provide the link for propagation. In some examples, in providing the link for propagation, server computing device 130 may cause one or more electronic communications including a link and/or the content accessible by the link, to be sent to the members of the entity, or entity group, that the propagation threshold has been determined to be exceeded for.

In other examples, in providing the link for propagation, server computing device 130 may mark the link as being available for propagation to the members of the entity, or an entity group, that the propagation threshold has been determined to be exceeded for. In some examples, the marked link may be stored in tenant content repository 132, and accessible by one or more content distribution applications. For example, server computing device 120 may perform one or more content request and/or content distribution operations for a first content distribution application. Server computing device 122 may perform one or more content request and/or content distribution operations for a second content distribution application. Server computing device 124 may perform one or more content request and/or content distribution operations for a third content distribution application.

One or more of server computing devices 120, 122, and 124 may utilize an API, such as content application API 126, which allows them to query tenant content repository 132 for content related to entity members that their corresponding applications have content distribution permissions for. If a determination is made by a computing device associated with tenant content repository 132, such as server computing device 130, that one or more links have been marked as exceeding a propagation threshold for members of an entity or entity group that a requesting application server has content distribution permissions for, server computing device 130 may provide those one or more links and/or content associated with those links back to a corresponding requesting application server (e.g., server computing device 120, server computing device 122, and/or server computing device 124).

Upon receiving a link and/or content associated with a link that has been marked as exceeding a propagation threshold, a corresponding application server (e.g., server computing device 120, server computing device 122, and/or server computing device 124) may provide the link, and/or content associated with the link, to the members that the propagation threshold has been determined to be exceeded for. For example, one or more of server computing devices 120, 122, and/or 124 may provide an email with the link to one or more computing devices (e.g., member computing devices 135, 138, and 140) associated with members that subscribe to their corresponding content distribution applications for which that link was determined to exceed a propagation threshold for. In other examples, one or more of server computing devices 120, 122, and/or 124 may cause the content that is accessible by the link to be displayed on one or more of member computing devices 120, 122, and/or 124 utilizing a user interface associated with each of the content distribution applications for which that link was determined to exceed a propagation threshold for.

Figure 2:
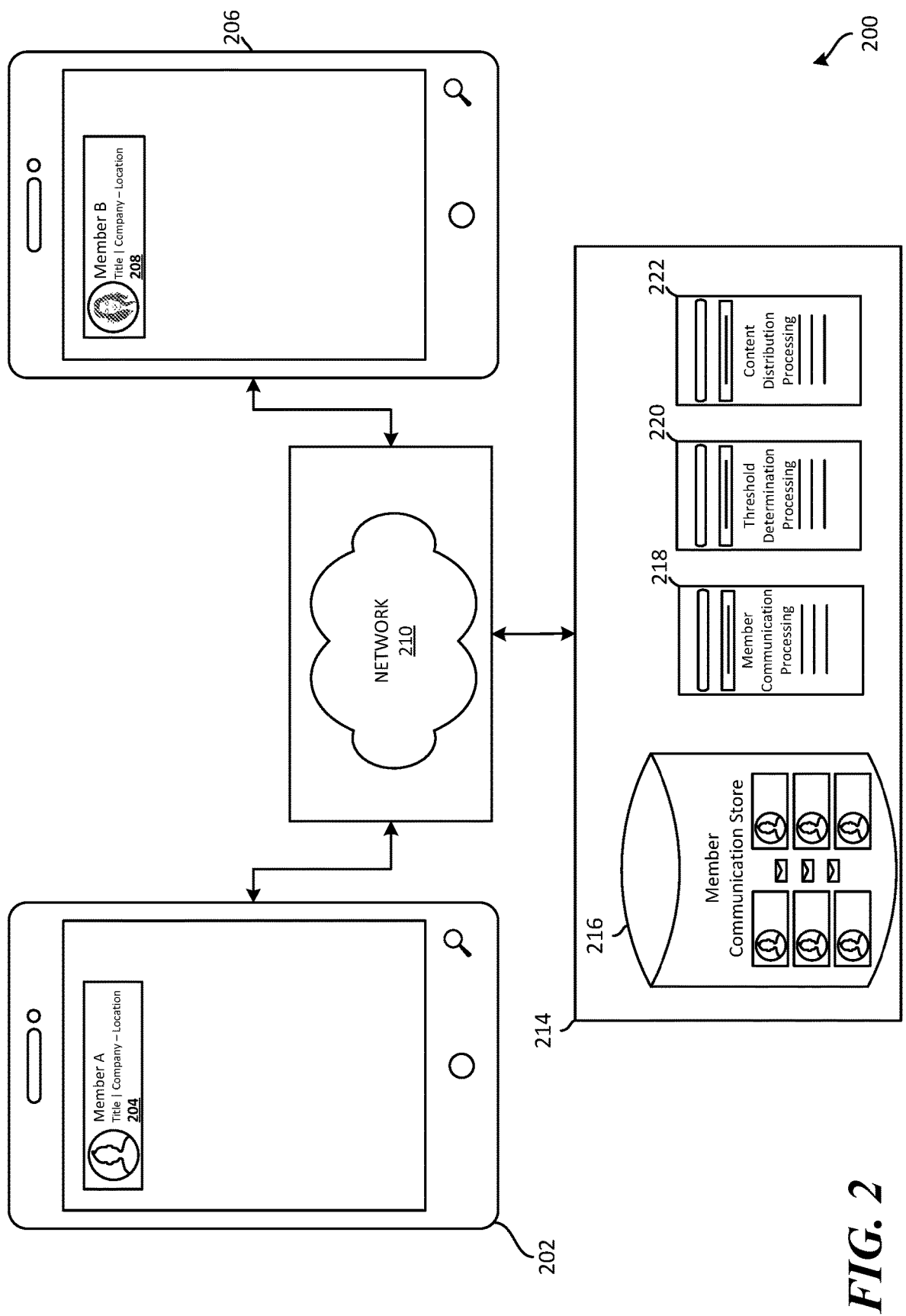
FIG. 2 is a schematic diagram of an exemplary environment for identifying member distribution groups based on member communications.

FIG. 2 is a schematic diagram of an exemplary environment 200 for identifying member distribution groups based on member communications. Exemplary environment 200 includes first computing device 202, which is a computing device used by a first member of an entity or entity group. A preview of the first member's profile 204 is shown on the graphical user interface of computing device 202. Exemplary environment 200 also includes second computing device 206, which is a computing device used by a second member of the entity or entity group. A preview of the second member's profile 208 is shown on the graphical user interface of computing device 206.

Exemplary environment 200 also includes network 210, by which computing devices 202 and 206 may communicate with one another, as well as with one or more computing device in communication processing and storage sub-environment 214 (e.g., server computing device 218, server computing device 220, and server computing device 222).

The first and second members may communicate with one another via one or more applications and network 210. For example, the first and second members may exchange one or more emails with one another via an email application, first and second members may communicate with one another via an instant messaging application, first and second members may communication with one another via audio and video applications, etc. In some examples, one or more communication signals associated with each communication between the first and second members may be provided, via network 210, to communication processing and storage sub-environment 214. In some examples, the one or more communication signals may be transferred to communication processing and storage sub-environment 214 contemporaneously with the occurrence of the communication. In other examples, the one or more communication signals may be transferred to communication processing and storage sub-environment 214 at timed intervals, such as every week, every month, every year, etc.

In some examples, the one or more communication signals may be transferred to a member communication store, such as member communication store 216. Member communication store 216 may comprise communication signals from a plurality of members associated with one or more applications. For example, member communication store 216 may comprise communication signals associated with communications between the first member and the second member, as well as a plurality of other entity members, which may or may not be shared connections of the first member and the second member.

One or more communication signals from the first and second members may be provided from member communication store 216 to server computing device 218, which may perform one or more operations associated with determining a communication value between the first and second members, and determining whether the first and second members are associated with a common entity, a common entity group, or a common entity sub-group based on the determined communication value for the members.

In other examples, the first and second members may represent entity members generally, that may communicate with one or more other entity members. For example, the first entity members may communicate, via one or more applications, with one or more other entity member users and one or more communication signals from those communications may be transferred, via network 210, to communication processing and storage sub-environment 214. Similarly, the second entity member may communicate, via one or more applications, with one or more other entity members and one or more communication signals from those communications may be transferred, via network 210, to communication processing and storage sub-environment 214. It should be understood that there may be a plurality of entity members that communicate with one another, and corresponding signals for each of those entity members may be similarly transferred, via network 210, to communication processing and storage sub-environment 214.

If a determination is made by server computing device 218, that a calculated communication value between a first entity member and one or more additional entity members is above a content propagation threshold for propagating a shared link to those members, the shared link may be provided for propagation to those members.

The set of entity members may be associated with one another in that they share a computer network domain, they share an email domain, they share a common organization in an application profile, one or more communication signals indicate that they have communicated with one another to a certain degree and/or frequency, and/or they are otherwise associated within at least one application associated with one another (e.g., they have been designated by a system administrator as being associated with one another, they have accepted a friend request from one another, etc.).

Figure 3:
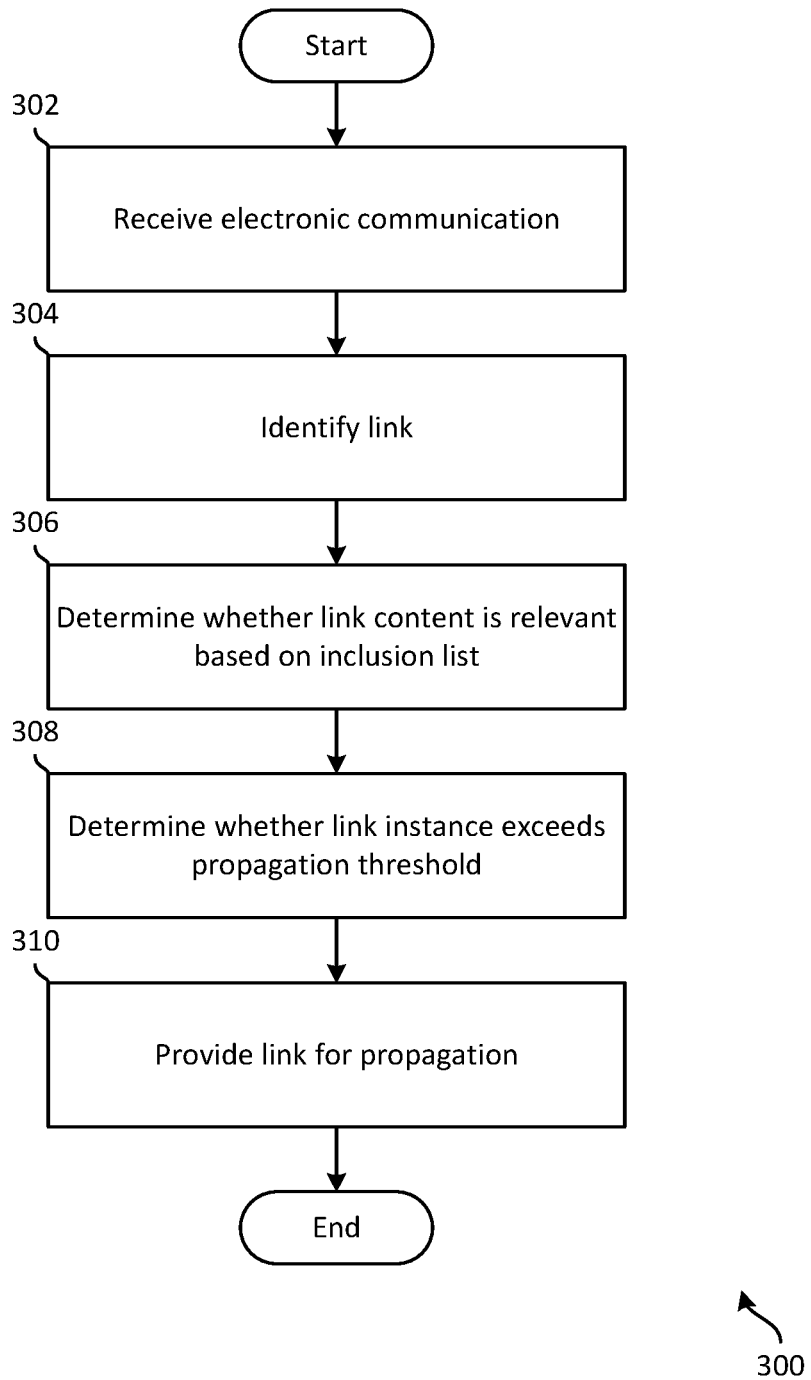
FIG. 3 is an exemplary method for recommending content associated with a shared link.

FIG. 3 is an exemplary method 300 for recommending content associated with a shared link. The method 300 begins at a start operation and flow continues to operation 302 where an electronic communication is received. The electronic communication may comprise a sent or received communication to or from one or more members of an entity or entity group that is associated with a content propagation service and/or a content dissemination application that utilizes one or more services provided by a content propagation service. Electronic communications that may be received include communications such as email communications, instant messaging communications, and calendar application communications, among others.

From operation 302 flow continues to operation 304, where a received electronic communication is analyzed for the presence of a link, and a link is identified as being included with that electronic communication.

From operation 304 flow continues to operation 306 where a determination is made as to whether content accessible by the link is relevant and/or allowable content for distribution to one or more members of an entity or entity group. For example, content that is accessible by the link may be analyzed and the content may be determined to be associated with one or more categorical content types. One or more categorical content types that the link provides access to may be checked against an inclusion list for one or more members of an entity and or entity group, and a determination may be made as to whether the content accessible by the link is allowable for content distribution to one or more of those members.

From operation 306 flow continues to operation 308 where a determination is made as to whether a link instance exceeds a propagation threshold. In some examples a link instance may comprise the sending of a link to a member of an entity. In other examples, a link instance may comprise the receiving and/or accessing of a link by a member of an entity. In additional examples, a link instance may comprise the sending and receiving and/or accessing of a link amongst members of an entity. A propagation threshold may be exceeded when a threshold number of members of an entity or entity group have sent, received and/or accessed a link. In other examples, a propagation threshold may be exceeded when a threshold percentage of members of an entity or entity group have sent, received and/or accessed a link. According to some examples, if a link instance is determined to exceed a propagation threshold, the corresponding link may be marked as being available for propagation by one or more content dissemination applications and/or or to one or more subscribing members of one or more content dissemination applications.

From operation 308 flow continues to operation 310 where the link is provided for propagation. In some examples, providing the link for propagation may comprise causing one or more electronic communications including a link that has been determined to meet a propagation threshold and/or content accessible by the link, to be sent to the members of the entity, or entity group, that the propagation threshold has been determined to be exceeded for.

In other examples, in which the link has been marked as being available for propagation by one or more content dissemination applications, the marked link may be stored in a tenant content repository, which may be accessible by one or more content distribution applications. One or more content dissemination applications may query the tenant content repository for one or more links and/or content accessible by links that are marked as being available for propagation. In some examples, an API may be provided for accessing the tenant content repository and retrieving associated content related to marked links. For example, an email application or a content aggregation and dissemination application may call into the tenant content repository, and a link to that content, or the content itself, may be provided to the calling application, which may then disseminate the link and/or the link content to its members/subscribers that it has been approved to distribute the corresponding content to.

From operation 310 flow moves to an end operation, and the method 300 ends.

Figure 4:
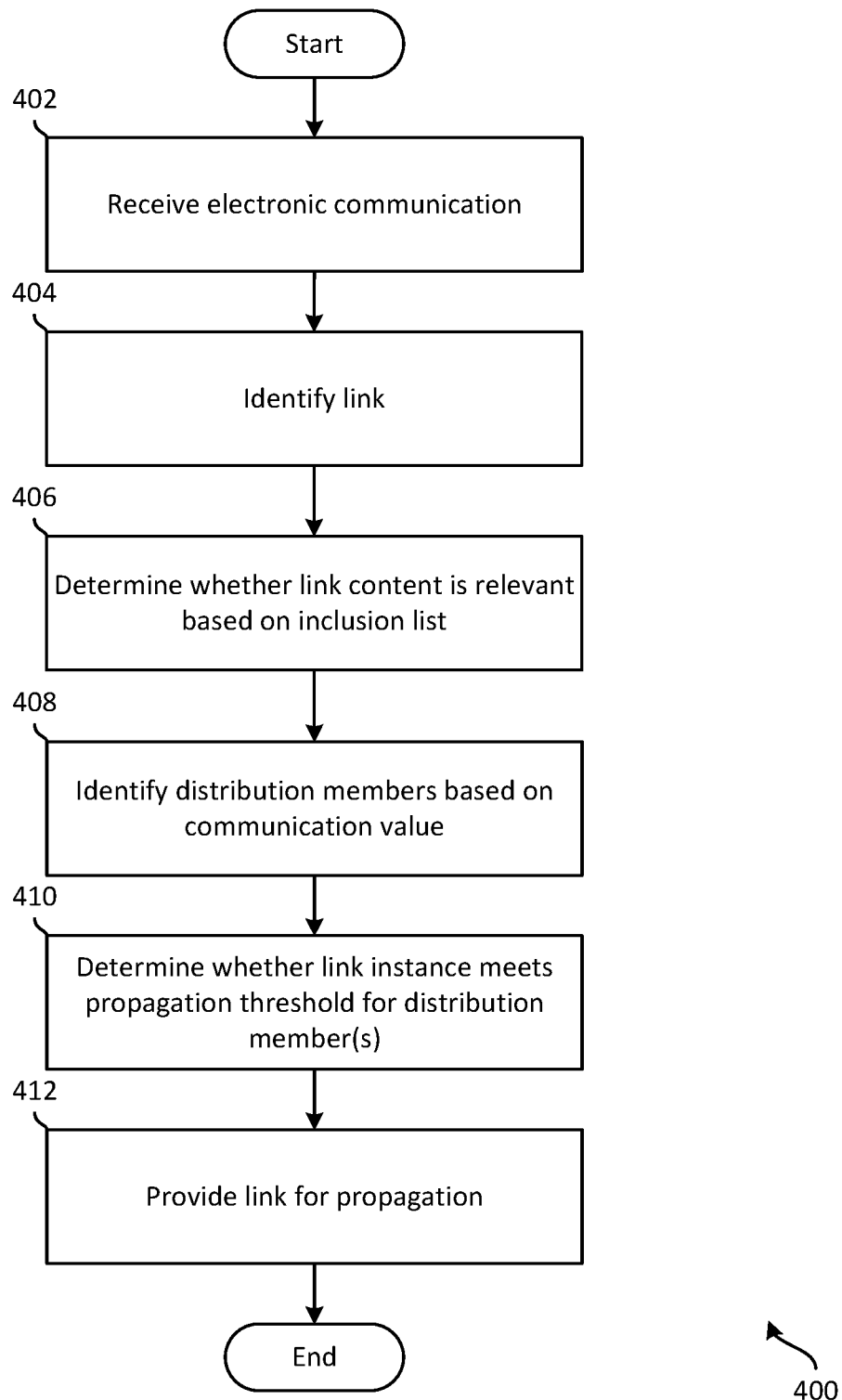
FIG. 4 is an exemplary method for recommending content associated with a shared link based on identification of member distribution groups.

FIG. 4 is an exemplary method 400 for recommending content associated with a shared link based on identification of member distribution groups. The method 400 begins at a start operation and flow continues to operation 402 where an electronic communication is received. The electronic communication may comprise a sent or received communication to or from one or more members of an entity or entity group that is associated with a content propagation service and/or a content dissemination application that utilizes one or more services provided by a content propagation service. Electronic communications that may be received include communications such as email communications, instant messaging communications, and calendar application communications, among others.

From operation 402 flow continues to operation 404 where a received electronic communication is analyzed for the presence of a link, and a link is identified as being included with the electronic communication.

From operation 404 flow continues to operation 406 where a determination is made as to whether content accessible by the link is relevant and/or allowable content for distribution to one or more members of an entity or entity group. For example, content that is accessible by the link may be analyzed and the content may be determined to be associated with one or more categorical content types. One or more categorical content types that the link provides access to may be checked against an inclusion list for one or more members of an entity and/or entity group, and a determination may be made as to whether the content that is accessible by the link is allowable for content distribution to one or more of those members.

From operation 406 flow continues to operation 408 where one or more entity members are identified for which the content accessible by the link is allowable for distribution to. Those members may be identified based on one or more communication values associated with entity member communications. For example, a first entity member may communicate with a plurality of entity members and one or more communication signals associated with those communications may be received. The communication signals may be analyzed and a determination may be made as to a communication value to assign to each of the entity members as their communications relate to each of the other entity members for which communication signals have been received. In some examples, a communication value amongst entity members may be assigned based on: the frequency of communication between entity members, the content of communications between entity members, the length of content of communications between entity members, etc. Upon determining a communication value for each entity member, one or more sets of associated entity members may be identified as a distribution set for propagating a link, or content associated with a link, to. In some examples, a set of associated entity members may be identified according to a determined communication value between each other entity member, in addition to a related content type for disseminating to associated entity members.

From operation 408 flow continues to operation 410 where a determination is made as to whether a link instance exceeds a propagation threshold. In some examples a link instance may comprise the sending of a link to a member of an entity. In other examples, a link instance may comprise the receiving and/or accessing of a link by a member of an entity. In additional examples, a link instance may comprise the sending and receiving and/or accessing of a link amongst members of an entity. A propagation threshold may be exceeded when a threshold number of members of an entity or entity group have sent, received and/or accessed a link. In other examples, a propagation threshold may be exceeded when a threshold percentage of members of an entity or entity group have sent, received and/or accessed a link. According to some examples, if a link instance is determined to exceed a propagation threshold, the corresponding link may be marked as being available for propagation by one or more content dissemination applications and/or or to one or more subscribing members of one or more content dissemination applications.

From operation 410 flow continues to operation 412 where the link is provided for propagation. In some examples, providing the link for propagation may comprise causing one or more electronic communications including a link that has been determined to meet a propagation threshold and/or content accessible by the link, to be sent to the members of the entity, or entity group, that the propagation threshold has been determined to be exceeded for. For example, a set of associated entity members may be identified for which a propagation threshold has been exceeded based on a determined communication value being exceeded for each of those members in the set.

In other examples in which the link has been marked as being available for propagation by one or more content dissemination applications, the marked link may be stored in a tenant content repository, which may be accessible by one or more content distribution applications. One or more content dissemination applications may query the tenant content repository for one or more links and/or content accessible by links that are marked as being available for propagation. In some examples, an API may be provided for accessing the tenant content repository and retrieving associated content related to marked links. For example, an email application or a content aggregation and dissemination application may call into the tenant content repository, and a link to that content, or the content itself, may be provided to the calling application, which may then disseminate the link and/or link content to its members/subscribers that it has been approved to distribute the corresponding content to.

From operation 412 flow moves to an end operation, and the method 400 ends.

Figure 5:
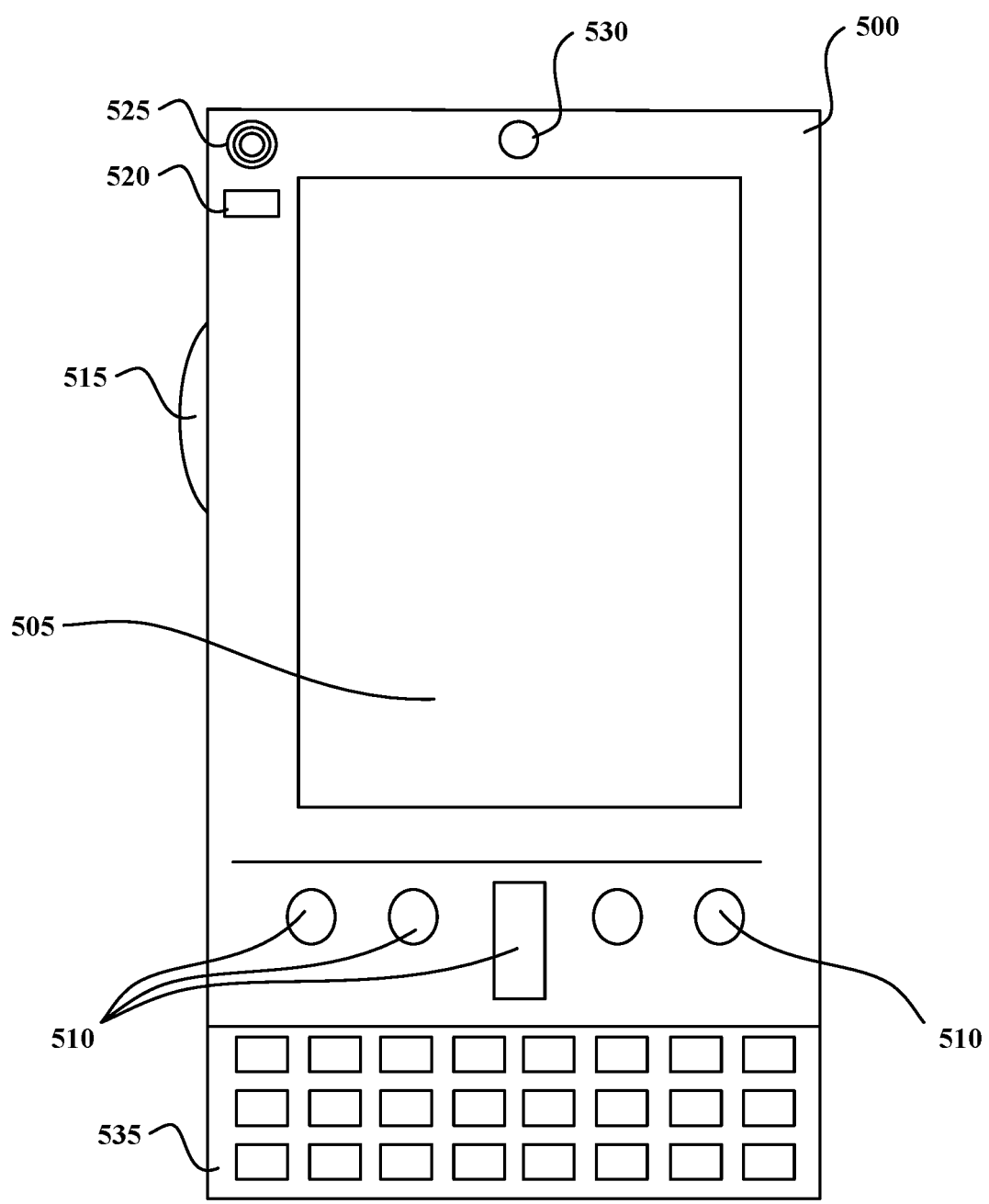
FIGS. 5 and 6 are simplified diagrams of a mobile computing device with which aspects of the disclosure may be practiced.
Figure 6:
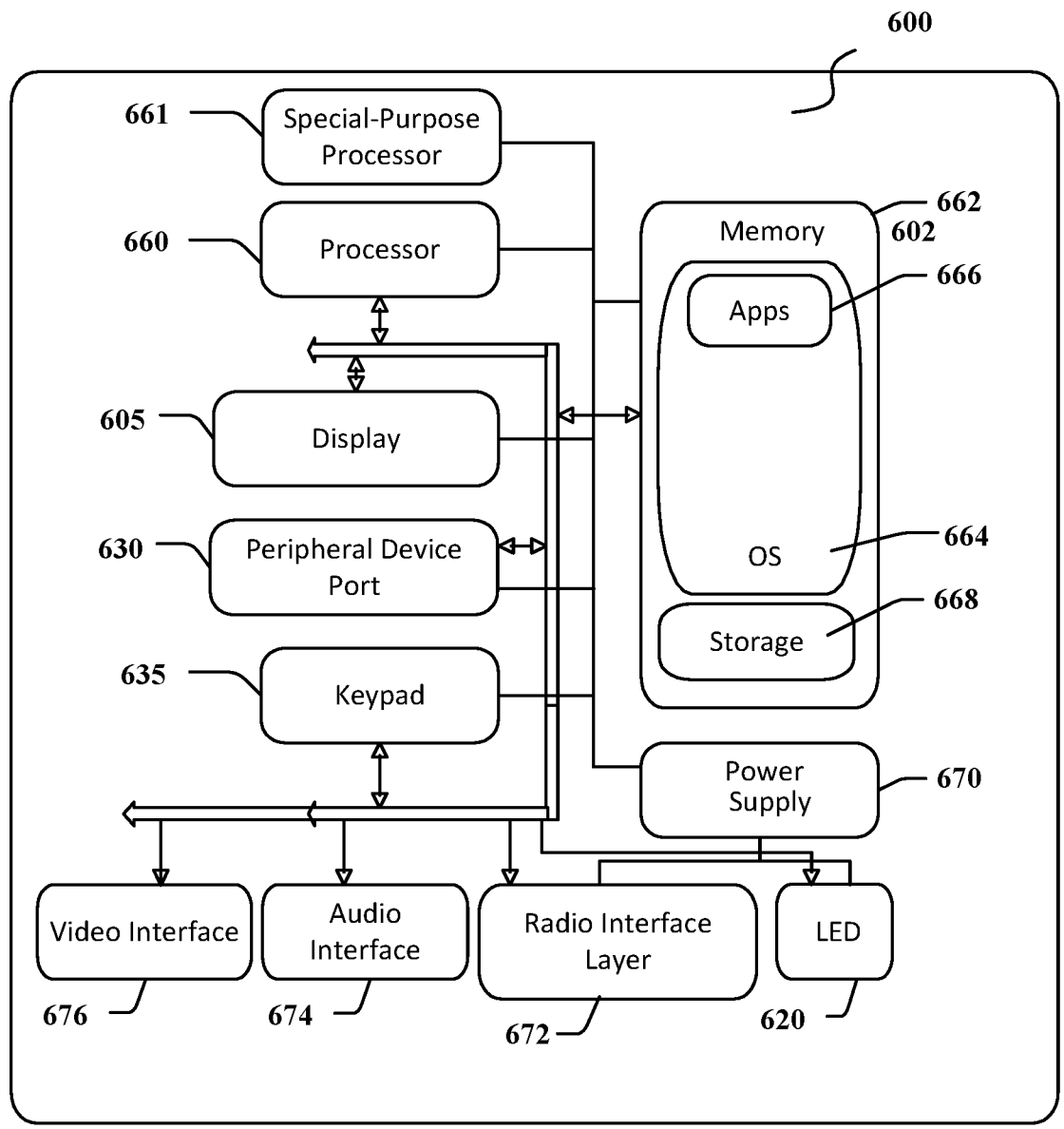

FIGS. 5 and 6 illustrate a mobile computing device 500, for example, a mobile telephone, a smart phone, wearable computer (such as a smart watch), a tablet computer, an e-reader, a laptop computer, and the like, with which embodiments of the disclosure may be practiced. In some aspects, the client may be a mobile computing device. With reference to FIG. 5, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 6 is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the instructions for recommending content associated with a shared link.

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 520 may be used to provide visual notifications, and/or an audio interface 674 may be used for producing audible notifications via the audio transducer 525. In the illustrated embodiment, the visual indicator 520 is a light emitting diode (LED) and the audio transducer 525 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 525, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 530 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6 by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
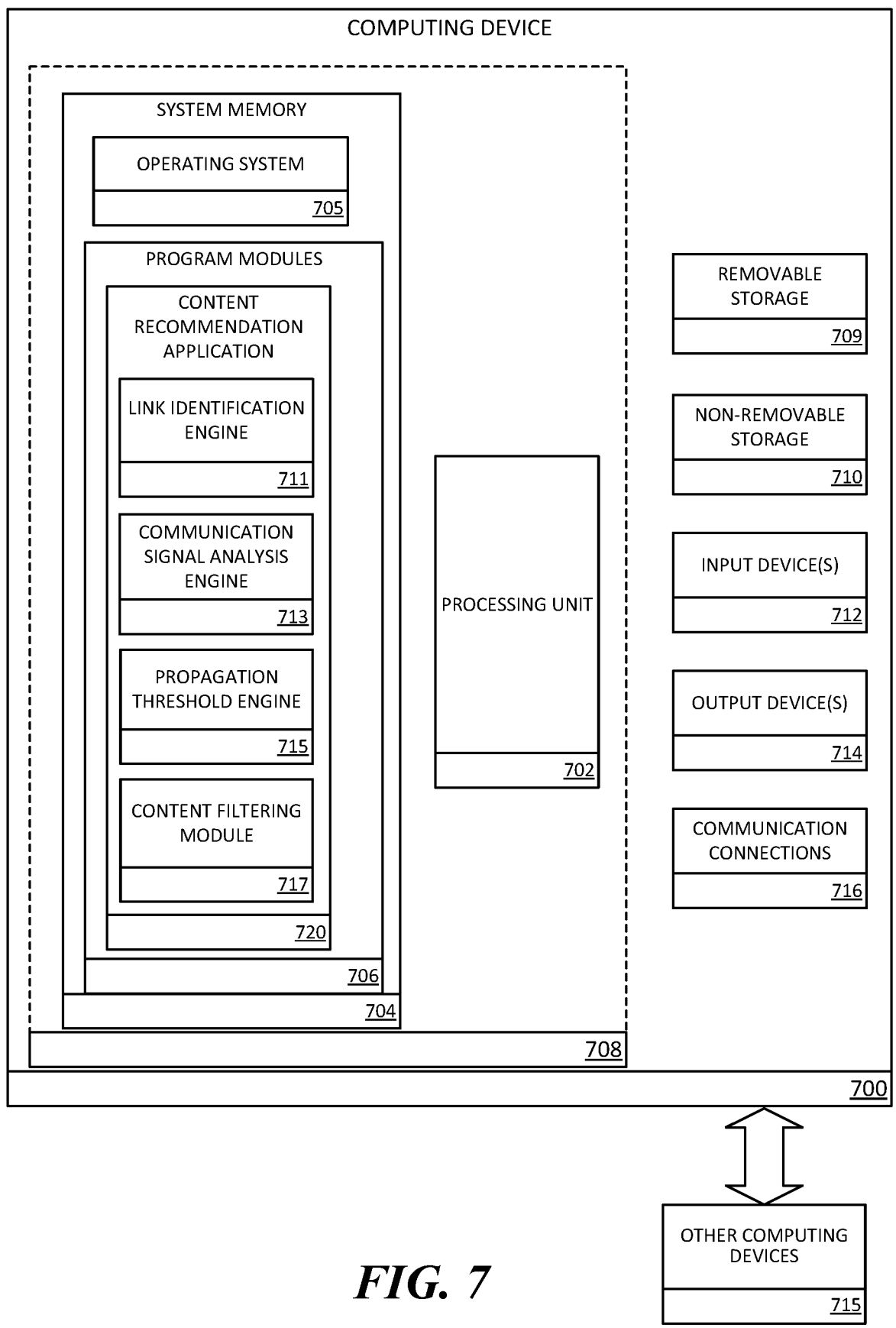
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may have computer executable instructions for recommending content associated with a shared link. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 804 may include an operating system 705 suitable for running one or more recommending content associated with a shared link. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 802, the program modules 706 (e.g., content recommendation application 720) may perform processes including, but not limited to, the aspects, as described herein. According to examples, the link identification engine 711 may perform one or more operations associated with analyzing a plurality of signals associated with electronic member communications and determining whether electronic communications contain a link. Communication signal analysis engine 713 may perform one or more operations associated with identifying one or more members that sent, received, and/or opened an electronic communication, calculating a communication value between entity members based on their communications, and determining what the content of a link provided in electronic communications relates to. Propagation threshold engine 715 may perform one or more operations related to determining whether a threshold has been met for providing a link, or its associated content, for propagation and/or dissemination to one or more entity members. Content filtering module 717 may perform one or more operations related to determining whether content associated with a link is allowable for dissemination based on it being associated with an inclusion list, and/or filtering content that may be malicious and/or otherwise unsuitable for distribution to one or more members of an entity.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8:
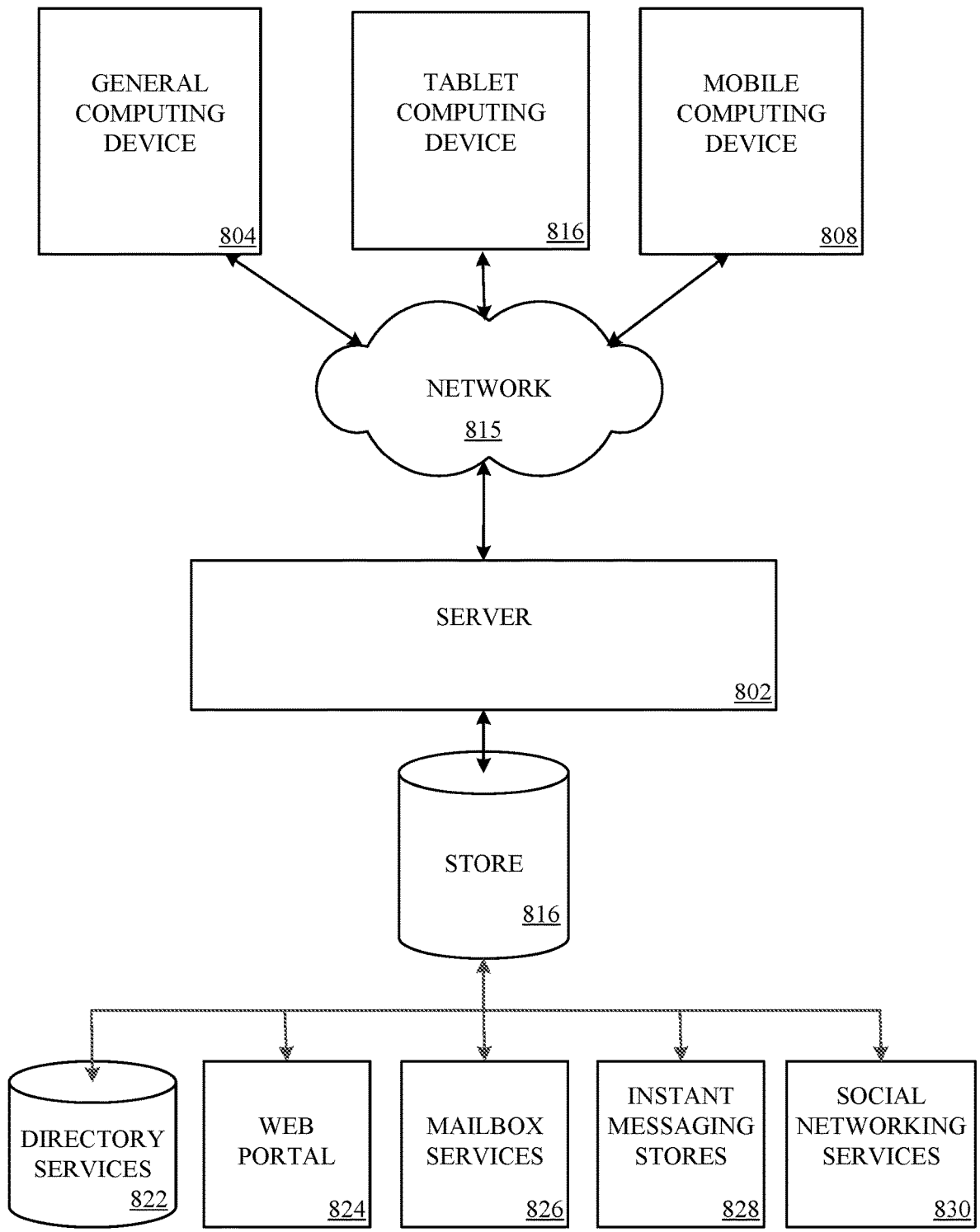
FIG. 8 is a simplified block diagram of a distributed computing system in which aspects of the present disclosure may be practiced.

FIG. 8 illustrates one aspect of the architecture of a system for processing data received at a computing system from a remote source, such as a personal/general computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830. The program modules 706 may be employed by a client that communicates with server device 802, and/or the program modules 706 may be employed by server device 802. The server device 802 may provide data to and from a client computing device such as a personal/general computer 804, a tablet computing device 806 and/or a mobile computing device 808 (e.g., a smart phone) through a network 815. By way of example, the computer system described above with respect to FIGS. 5-7 may be embodied in a personal/general computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
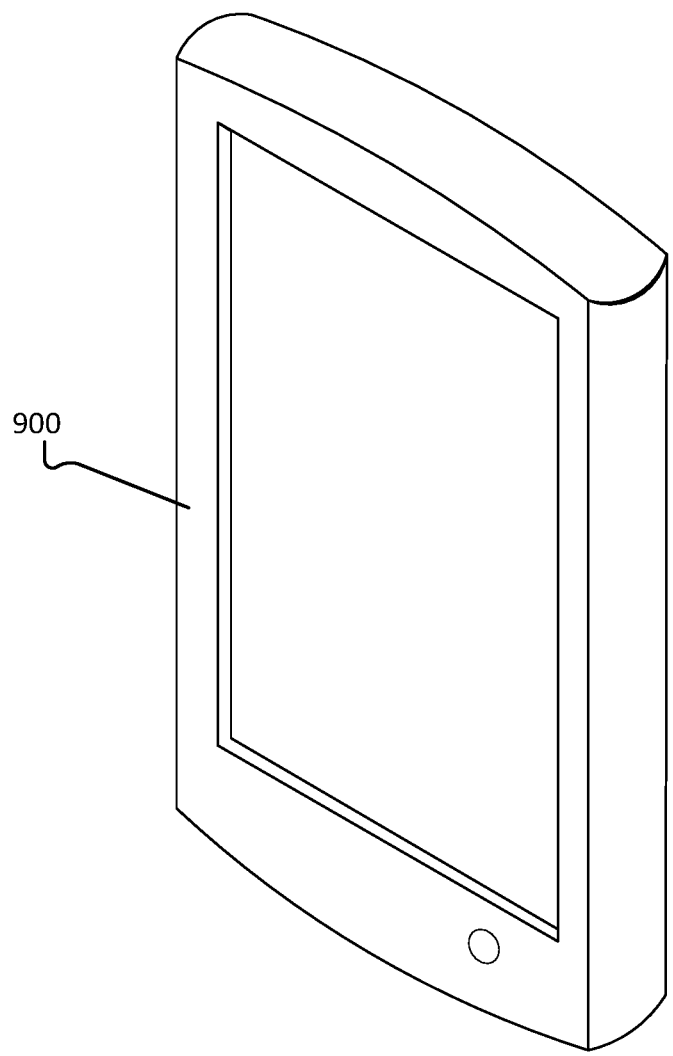
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

As will be understood from the foregoing disclosure, one aspect of the technology relates to a method for recommending content, comprising: receiving an electronic communication between a plurality of members of a common entity; identifying a link to web content in the electronic communication; determining a number of instances that the link has been electronically shared with members of the common entity; determining whether a content propagation threshold has been exceeded based on electronic sharing of the link amongst members of the common entity; and upon determining that the content propagation threshold has been exceeded, providing the link for propagation. In some aspects, the link is provided for propagation upon: receiving a request to propagate content of a specific type; and determining that the link provides access to content of the specific type. In other aspects, providing the link for propagation further comprises marking the link as being available for propagation to one or more applications. In additional aspects, marking the link as being available for propagation to one or more applications comprises providing an indication of at least one categorical type of content that the link provides access to. In additional aspects, the method may comprise checking the link against a content type inclusion list and determining whether the link provides access to content of a type that is included in the content type inclusion list. In some aspects, the content type inclusion list comprises a plurality of content types that are of interest to at least one organizational unit within the common entity, and wherein the link is only provided for propagation to an organizational unit within the common entity upon determining that the link provides access to a content type that is included in the content type inclusion list. In still other aspects, determining whether the content propagation threshold has been exceeded based on electronic sharing of the link amongst members of the common entity comprises identifying that the link has been shared with at least one of: a threshold number of members of the common entity, and a threshold percentage of members of the common entity. In yet other aspects, determining whether the content propagation threshold has been exceeded based on electronic sharing of the link amongst members of the common entity comprises identifying that the link has been accessed by at least one of: a threshold number of members of the common entity, and a threshold percentage of members of the common entity. According to some aspects, determining whether the content propagation threshold has been exceed based on electronic sharing of the link amongst members of the common entity comprises identifying that the link has been shared by at least one of: a threshold number of members of the common entity, and a threshold percentage of members of the common entity. In other aspects, the threshold number of members of the common entity is based on one or more hierarchical roles within the common entity that the sharing members have. In additional aspects, providing the link for propagation comprises: identifying members of the common entity that exceed a communication threshold value; and marking the link as being available for propagation to the members of the common entity that are identified as exceeding the communication threshold value.

In another aspect, the technology relates to a system for recommending content, the system comprising: a memory for storing executable program code; and a processor, functionally coupled to the memory, the processor being responsive to computer-executable instructions contained in the program code and operative to: receive an electronic communication between a plurality of members of a common entity; identify a link to web content in the electronic communication; determine a number of instances that the link has been electronically shared with members of the common entity; determine whether a content propagation threshold has been exceeded based on electronic sharing of the link amongst communicatively connected members of the entity; and upon determining that the content propagation threshold has been exceeded, providing the link for propagation. According to some aspects, the processor is further responsive to computer-executable instructions contained in the program code and operative to identify a set of communicatively connected members of the common entity, the identification of the set comprising calculating a communication value between pairs of members of the common entity, wherein calculating the communication value between pairs of members of the common entity comprises collecting a plurality of communication signals shared between each pair. In other aspects, the content propagation threshold is exceeded when the link is shared amongst at least one of: a specific number of communicatively connected members, and a specific percentage of communicatively connected members. In still other aspects, the link is provided for propagation upon: receiving a request to propagate content of a specific type that is determined to be of interest to at least one of the communicatively connected members; and providing the link for propagation to one or more members of the set of communicatively connected members of the common entity that have been determined to have not received the link. According to some aspects, receiving a request to propagate content of a specific type that is determined to be of interest to at least one of the communicatively connected members comprises checking the link against a content type inclusion list and determining whether the link provides access to content of a type that is included in the content type inclusion list.

In another aspect, the technology relates to a computer-readable storage device comprising executable instructions, that when executed by a processor, assist with recommending content, the computer-readable storage device including instructions executable by the processor for: receiving an electronic communication between a plurality of members of a common entity; identifying a link to web content in the electronic communication; determining a number of instances that the link has been electronically shared with the members of the common entity; determining whether a content propagation threshold has been exceeded based on electronic sharing of the link amongst members of the common entity; and upon determining that the content propagation threshold has been exceeded, providing the link for propagation. In some aspects, providing the link for propagation further comprises determining whether content associated with the link matches a content type inclusion list for communicatively connected members of the entity. In additional aspects, the content type inclusion list comprises a plurality of content types that are of interest to at least one member of the communicatively connected members of the entity, and wherein the link is only provided for propagation to the at least one member. In other aspects, determining whether the content propagation threshold has been exceed based on electronic sharing of the link amongst members of the common entity comprises identifying that the link has been accessed by at least one of: a threshold number of members of the common entity, and a threshold percentage of members of the common entity.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for distribution of content, comprising:
   receiving an electronic communication between two or more members of a common entity, wherein the electronic communication includes a link to content;
   determining a categorical type or a media type of the content is allowable for distribution to members of the common entity;
   determining a number of instances the link has been shared with the members of the common entity has exceeded a propagation threshold; and
   providing members of the common entity access to the content.

2. The method of claim 1, wherein the electronic communication comprises email communications, instant messaging communications, and calendar application communications, and wherein the online content comprises web content, social media communications, and news articles.

3. The method of claim 1, wherein sharing the link with the members comprises sending the link to one of the members, receiving the link by one of the members, or accessing the link by one of the members.

4. The method of claim 1, wherein the propagation threshold comprises a threshold number of members that have sent, received, or accessed the link.

5. The method of claim 1, wherein providing access to the link comprises:
   determining the content accessible by the link is allowable for distribution to the members of the common entity by checking an inclusion list.

6. The method of claim 1, wherein providing the members of the common entity access to the content comprises:
   receiving a request for content from one of the members;
   determining that the requested content is available for propagation based on the propagation threshold having been exceeded; and
   providing the link to the requested content to the requesting member.

7. The method of claim 6, further comprising:
   prior to providing the link to the requesting member, determining that the requested content is allowable for distribution to the requesting member.

8. The method of claim 6, further comprising:
   storing the link in a content repository;
   storing the linked online content in the content repository; and
   providing an email to the requesting member, the email including the link to the requested content in the content repository,
   wherein the requested content is caused to be displayed on a computing device of the requesting member.

9. A system for distribution of content, comprising:
   a memory for storing executable program code;
   a content distribution application providing member access to the online content; and
   a processor, functionally coupled to the memory, the processor being responsive to computer-executable instructions contained in the program code and operative to:
      receive an electronic communication between two or more members of a common entity, wherein the electronic communication includes the link to the online content;
      determining a categorical type or a media type of the content is allowable for distribution to members of the common entity;
      determine a number of instances the link has been shared with the members of the common entity has exceeded a propagation threshold; and
      provide members of the common entity access to the content.

10. The system of claim 9, wherein sharing the link with the members comprises sending the link to one of the members, receiving the link by one of the members, or accessing the link by one of the members.

11. The system of claim 9, wherein the processor is further operative to:
    determine the content accessible by the link is allowable for distribution to the members of the common entity by checking an inclusion list.

12. The system of claim 9, wherein providing the members of the common entity access to the content comprises the processor being further operative to:
    receive a request for content from one of the members;
    determine that the requested content is available for propagation based on the propagation threshold having been exceeded; and
    provide, with the content distribution application, the link to the content to the requesting member.

13. The system of claim 12, wherein the processor is further operative to, prior to providing the content link to the requesting member, determine that the requested content accessible by the link is allowable for distribution to the requesting member.

14. The system of claim 9, further comprising a content repository, wherein the processor is further operative to:
    store the link in the content repository;
    store the linked content in the content repository; and
    provide an email to the requesting member, the email including the link to the requested content in the content repository,
    wherein the requested content is caused to be displayed on a computing device of the requesting member.

15. A computer-readable storage device comprising executable instructions, that when executed by a processor, assist with distributing content, the computer-readable storage device including instructions executable by the processor for:
    receiving an electronic communication between a plurality of members of a common entity, wherein the electronic communication includes a link to content;
    determining a categorical type or a media type of the content is allowable for distribution to members of the common entity;
    determining a number of instances the link has been shared with the members of the common entity has exceeded a propagation threshold; and
    providing members of the common entity access to the content.

16. The method of claim 15, wherein the electronic communication comprises email communications, instant messaging communications, and calendar application communications, and wherein the online content comprises web content, social media communications, and news articles.

17. The method of claim 15, wherein sharing the link with the members comprises sending the link to one of the members, receiving the link by one of the members, or accessing the link by one of the members.

18. The computer-readable storage device of claim 15, wherein providing the members of the common entity access to the content comprises:
   receiving a request for content from one of the members;
   determining that the requested content is available for distribution based on the propagation threshold having been exceeded;
   determining that the requested content is allowed to be distributed to the requesting member; and
   providing to the requesting member, with a content distribution application, the link to the content.

19. The computer-readable storage device of claim 15, wherein the instructions are further executable by the processor for:
   storing the link in a content repository;
   storing the linked content in the content repository; and
   providing an email to the requesting member, the email including the link to the requested content in the content repository,
   wherein the requested content is caused to be displayed on a computing device of the requesting member.

20. The computer-readable storage device of claim 15, wherein the instructions are further executable by the processor for:
   determining the content accessible by the link is allowable for distribution to the members of the common entity by checking an inclusion list.

* * * * *